United States Patent [19]

Gies

[11] Patent Number: 5,595,069
[45] Date of Patent: Jan. 21, 1997

[54] ADJUSTABLE REFREEZABLE UTILITY COOLER

[76] Inventor: Ronald A. Gies, N. 7217 Fotheringham, Spokane, Wash. 99208

[21] Appl. No.: 519,415

[22] Filed: Aug. 25, 1995

[51] Int. Cl.$^6$ ........................................... F25D 3/08
[52] U.S. Cl. ............................ 62/530; 62/457.4; 150/901; 383/121
[58] Field of Search ................................ 62/457.1, 457.2, 62/457.4, 457.5, 457.8, 371, 372, 530; 607/112; 215/12.1; 383/121; 150/901

[56] References Cited

U.S. PATENT DOCUMENTS

| | | | |
|---|---|---|---|
| 4,592,358 | 6/1986 | Westplate | 62/530 |
| 4,986,089 | 1/1991 | Raab | 62/457.4 |
| 5,005,374 | 4/1991 | Spitler | 62/530 |
| 5,147,067 | 9/1992 | Effertz | 220/739 |
| 5,188,877 | 2/1993 | Magaro | 428/80 |
| 5,279,452 | 1/1994 | Huynh | 224/42.45 R |
| 5,320,249 | 6/1994 | Strech | 220/739 |
| 5,325,991 | 7/1994 | Williams | 220/739 |

Primary Examiner—John M. Sollecito
Attorney, Agent, or Firm—David S. Thompson

[57] ABSTRACT

An adjustable, refreezable heat removing cooler for refrigerating and insulating a variety of products such as variously sized beverage containers, frozen dinners, reusable plastic food left-over containers, or other objects. The cooler provides a cover having an inner and an outer layer of urethane coated nylon fabric that is sewn to form an envelope-like jacket. An array of refrigerant pouches in an elongate refrigerant bag carry a freezable refrigerant, such as Blue Ice, or a similar reusable refrigerant. An insulation layer of Thinsulate or similar insulation slows heat energy transfer through the outer lay of urethane fabric. Lack of insulation between the inner layer of fabric enhances heat energy flow from the item being cooled into the refrigerant. An elongate strip having hook fasteners on one side and loop fasteners on the other side allows the user to attach the cooler to a variety of objects having different circumferences. A velcro strap perpendicular to the elongate cover allows the user to adjust the cooler and in particular supports the bottom of a soft drink container. Two or more such coolers may be linked together to encircle larger objects.

10 Claims, 4 Drawing Sheets

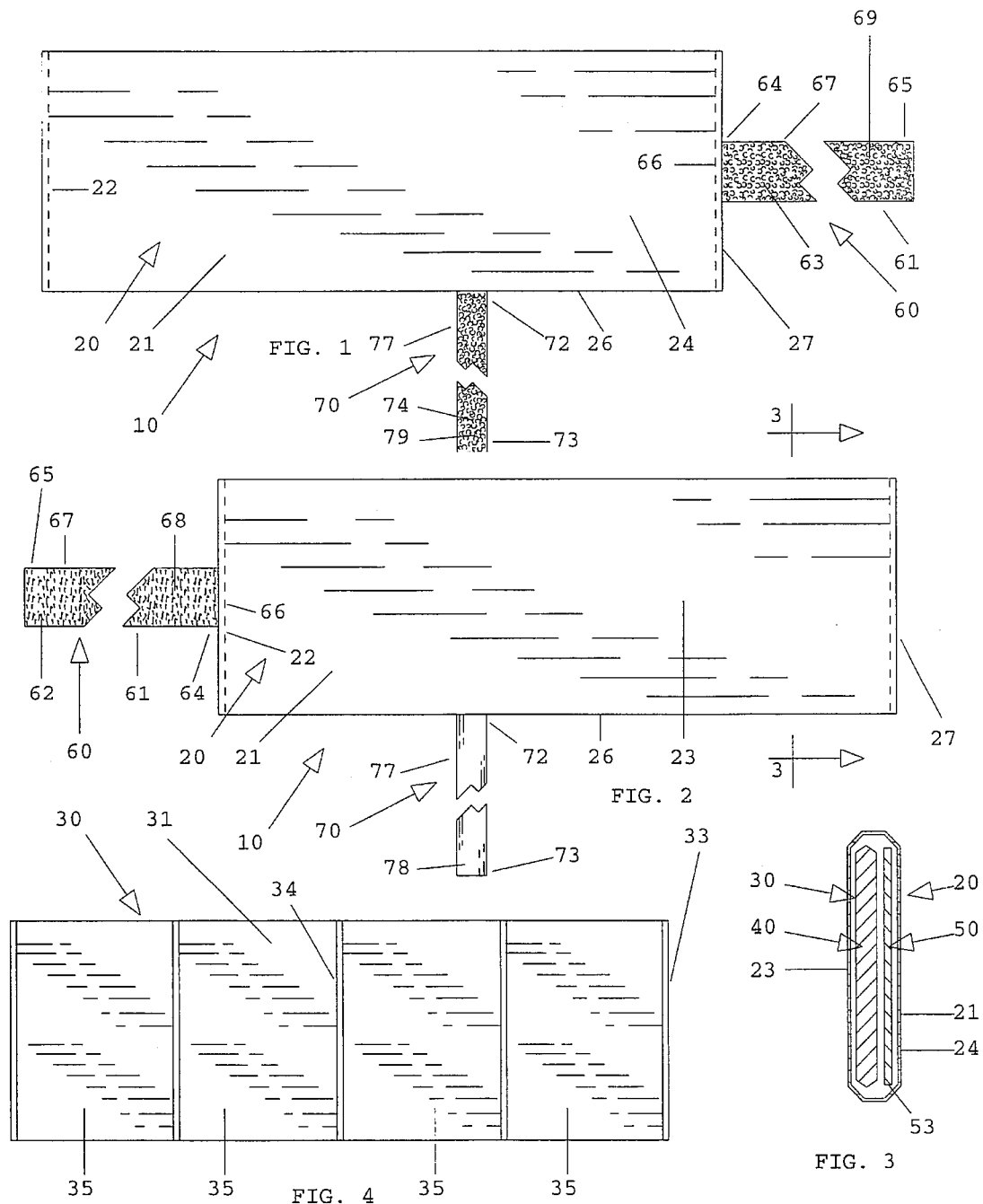

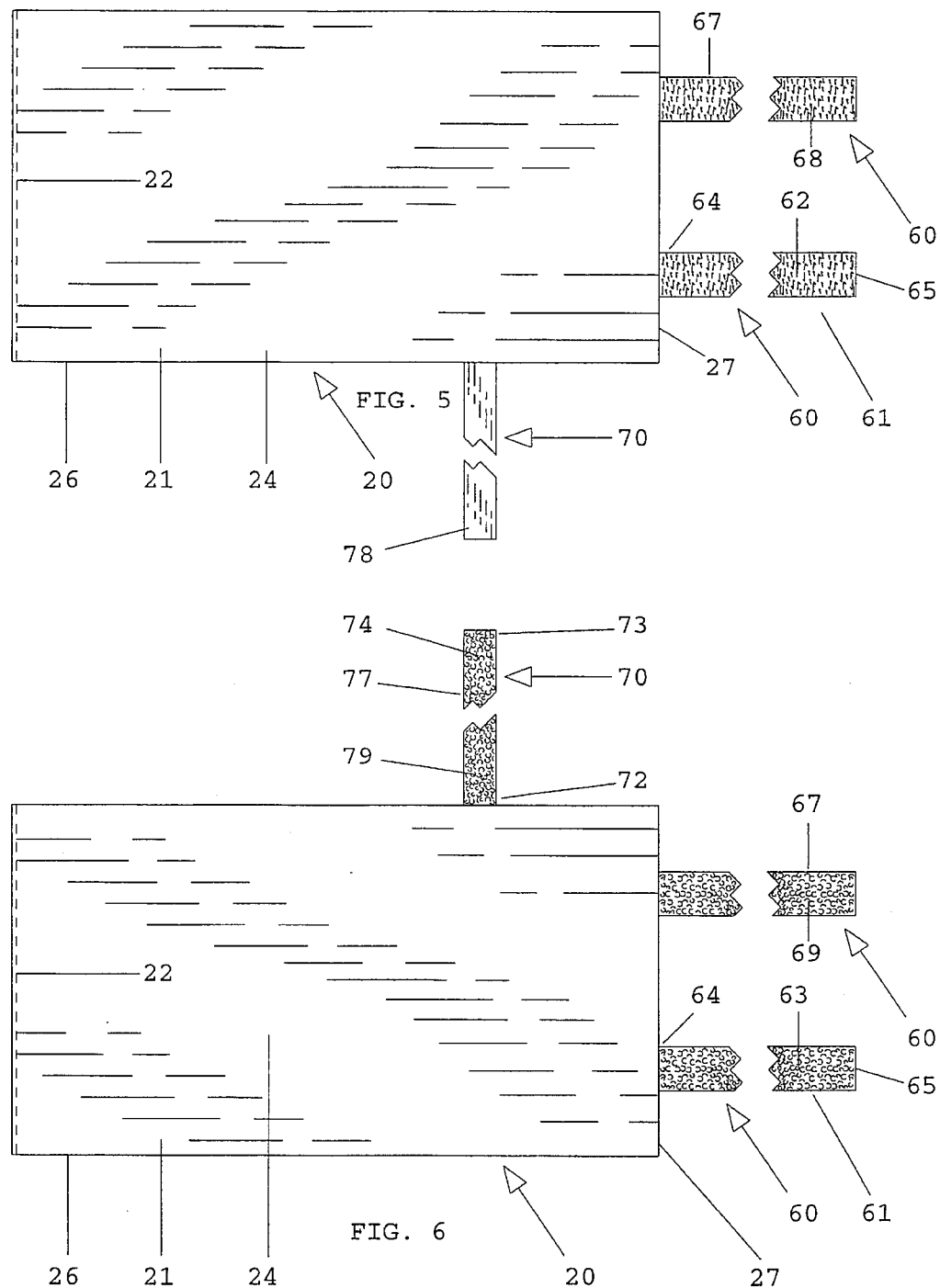

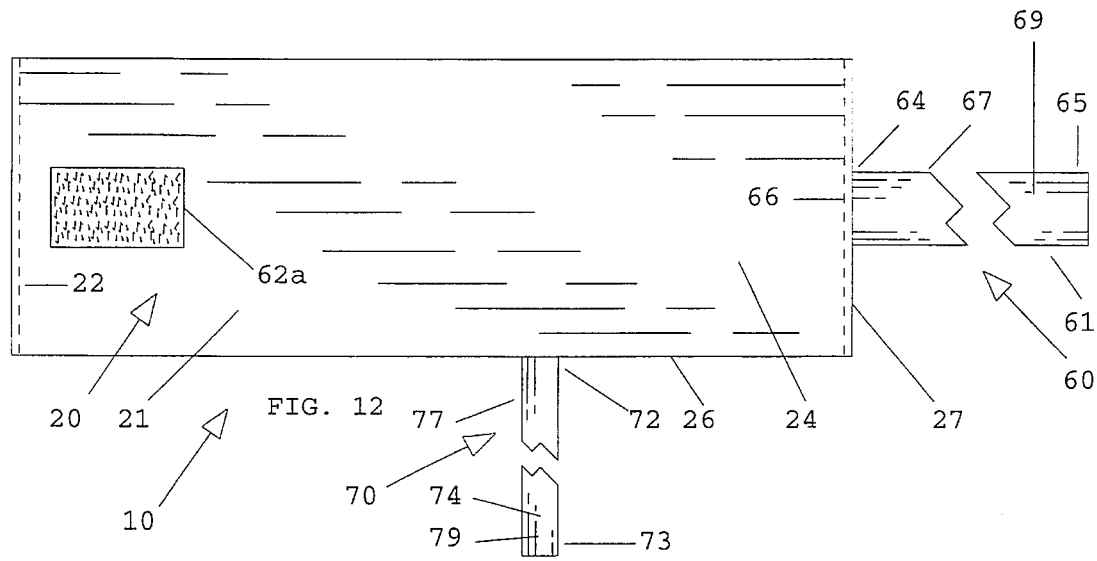
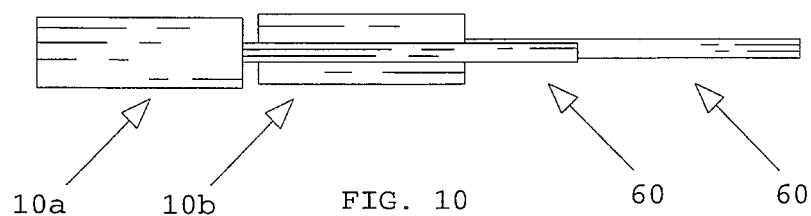
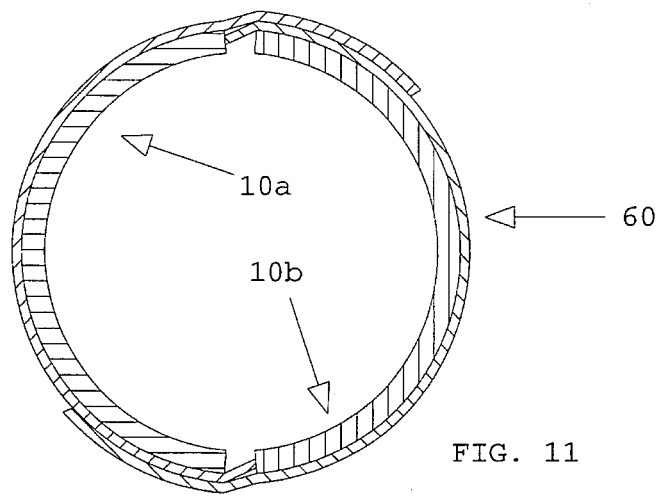

ADJUSTABLE REFREEZABLE UTILITY COOLER

CROSS-REFERENCES

There are no applications related to this application filed in this or any foreign country.

BACKGROUND

A considerable increase in the variety of frozen and refrigerated foods, particularly beverages and frozen foods, has encouraged many people to take such foods with them for later consumption. Many offices are equipped with microwave ovens, encouraging employees to bring frozen or refrigerated foods to work. However, for reasons of health or taste, most such foods must be refrigerated by the consumer prior to use. Unfortunately, with the exception of bulky ice filled chests, few if any products currently on the market will keep a wide variety of the most commonly used prepared food products refrigerated for a period of several hours.

For the greatest efficiency, consumers need an adjustable, refreezable utility cooler that may be used on almost any object that they need to refrigerate. While beverages and frozen foods may be the most common uses, other items, including a variety of differently sized Tupperware-type leftover food containers may also need to be refrigerated.

Many prior cooling devices fail to be useful in cooling a variety of differently sized objects. Some prior refreezable cooling devices are rigid in nature, and are suitable only for a specific use, such as for use with a 12 ounce soft drink can. To be effective in general use, the cooler must be flexible, even after the refrigerant has been frozen.

Other prior cooling devices fail to provide sufficiently adjustable fastening elements. Some fastening structures require that a first and a second fastening element be joined in a particular alignment, or that a first fastening element be joined with a second fastening element chosen from a group of several such elements, thus providing a step-function adjustment, with a finite num Ser of specific adjustment positions. To be suited for a variety of uses, the cooler must provide fastening means that adjust about the circumference of an object, and also adjust according to its depth. The adjustment should should be of a continuous nature, rather than a step-function, Other prior cooling devices fail to provide a layer of insulation to prevent heat flow into portions of the frozen refrigerant not in thermal contact with the object to be cooled. As a result, the refrigerant tends to melt more rapidly than is desirable. Insulation should be provided, so that the flow of heat into the refrigerant is primarily from the object being cooled.

Other prior cooling devices fail to provide structures to allow the linking together of multiple devices to accommodate larger objects to be cooled. As a result, the user of such a cooling device is less able to cool larger objects.

For the foregoing reasons, there is a need for an adjustable, refreezable utility cooler that is flexible in nature and that can be adjusted to cool objects of varying size by means of a lengthwise adjustable fastening structure and a perpendicular adjustable fastening structure. The lengthwise adjustable fastening structure must be able to compensate for objects of varying circumference, while the perpendicularly adjustable fastening structure must be able to compensate for objects of varying depth. The cooler must provide a heavy fabric cover containing one or more refrigerant bags carrying a refreezable refrigerant. Insulation should be provided on one side of the refrigerant bag, to limit unwanted heat flow into the refrigerant. The cooler should be configured so that multiple units may be linked together, to accommodate larger objects to be cooled.

SUMMARY

The present invention is directed to an apparatus that satisfies the above needs. A novel adjustable refreezable utility cooler that adjusts about both the circumference and the depth of an object to be cooled is provided. Two or more of the novel adjustable refreezable utility coolers may be linked together, so that larger objects may be cooled.

The adjustable refreezable utility cooler of the present invention provides:

(a) A cover, typically formed of a fabric body having an inside sheet and an outside sheet, held together by stitching. The body is typically rectangular, having a long side and a narrow side.

(b) A refrigerant bag carried in the cover. The refrigerant bag typically provides one or more of refrigerant pouches.

(c) A refrigerant, carried in the refrigerant pouches, such as water or a chemical, for absorbing heat energy. The refrigerant melts as heat energy is absorbed, thereby changing from a solid state to a liquid state.

(d) An insulation layer, carried between the outside sheet of the cover and the refrigerant bag, for reducing the rate of heat energy flow between the refrigerant bag and the outside sheet of the cover.

(e) A lengthwise adjustable fastening device, attached to the narrow side of the cover, for adjusting the length of the circumference of the cooler to a length just greater than the circumference of the object to be cooled and for linking to another cooler, so that more than one cooler may be used to cool an object.

(f) A perpendicular adjustable fastening device, attached to the long side of the cover and releasably attachable to the lengthwise adjustable fastening device, for adjusting for the depth of the object to be cooled.

A more detailed description includes the following:

(A) The lengthwise adjustable fastening device additionally provides:
  (a) A strip-like body, attached to the narrow side of the cover, having an inside surface and an outside surface and having a length greater than the length of the long side of the cover.
  (b) Male fastener material carried by the inside surface of the strip-like body.
  (c) Female fastener material carried by the outside surface of the strip-like body.

(B) The perpendicularly adjustable fastening structure device additionally provides:
  (a) A strip-like body, having an inside surface and an outside surface and having a length greater than the length of the narrow side of the cover.
  (b) Female fastener material carried by the inside surface of the strip-like body.

(C) The refrigerant bag additionally provides:
  (a) A plastic sheet body, having an inner sheet and an outer sheet.
  (b) A plurality of edge seals, end seals, and cross seals, whereby the inner sheet is attached to the outer sheet in a water-tight manner.
  (c) A number of refrigerant containing pouches.

It is therefore a primary advantage of the present invention to provide a novel adjustable refreezable utility cooler having the advantage of a lengthwise adjustable fastening structure that allows the circumference of the cooler to be adjusted.

Another advantage of the present invention is to provide a perpendicular adjustable fastening structure which allows the cooler to be adjusted to fit snugly about an object having known circumference and depth.

A still further advantage of the present invention is to provide an adjustable refreezable utility cooler that may be easily and conveniently refrozen for reuse.

A still further advantage of the present invention is to provide an adjustable refreezable utility cooler having a plurality of refrigerant pouches containing refrigerant, thereby allowing the cooler to be substantially flexible even after freezing.

A still further advantage of the present invention is to provide an adjustable refreezable utility cooler having a means to link two or more of the coolers together, thereby allowing the user to attach the linked coolers to a larger object to be cooled.

DRAWINGS

These and other features, aspects, and advantages of the present invention will become better understood with regard to the following description, appended claims, and accompanying drawings where:

FIG. 1 shows a side view of a version of the invention, showing the outside sheet of the cover and showing the outside surface of the lengthwise adjustable fastening structure and the outside surface of the perpendicularly adjustable fastening structure;

FIG. 2 shows a side view of the inside sheet of the cover of the cooler of FIG. 1, and showing the the inside surface Of the lengthwise adjustable fastening structure and the inside surface of the perpendicular adjustable fastening structure;

FIG. 3 shows a cross-section of the adjustable refreezable utility cooler of FIG. 2, along the 3—3 lines;

FIG. 4 shows a side view of a version of refrigerant bag of the invention having end seals and cross seals, but not having edge seals;

FIG. 5 shows a side view of a second, larger version of the invention, showing the inside sheet of the cover of the cooler, and showing the the inside surface of dual lengthwise adjustable fastening structures and the inside surface of the perpendicular adjustable fastening structure;

FIG. 6 shows a side view of the version of the invention of FIG. 5, showing the outside sheet of the cover of the cooler, and showing the the outside surface of dual lengthwise adjustable fastening structures and the outside surface of the perpendicular adjustable fastening structure;

FIG. 10 shows a somewhat diagrammatic view of a first utility cooler joined to a second utility cooler;

FIG. 11 shows a somewhat diagrammatic top view cross-section of two utility coolers joined together in a circular configuration; and FIG. 12 shows a side view of a second species of the invention, similar to the species of FIG. 1, but having a male velcro patch on the side of the cover.

DESCRIPTION

Figure 8:
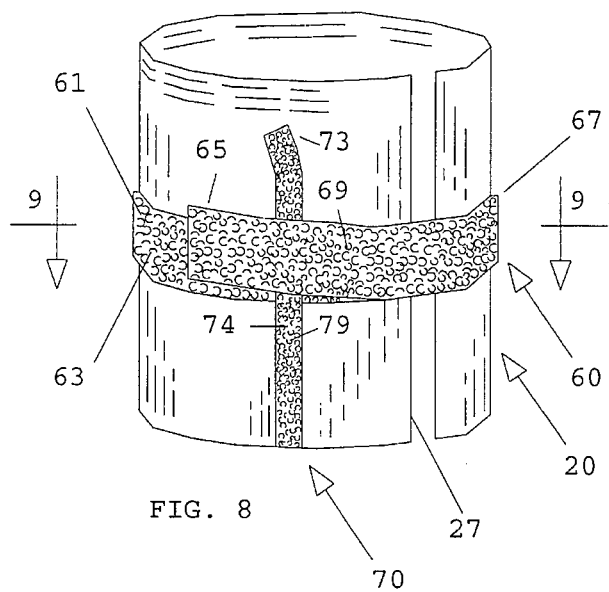
FIG. 8 shows a perspective view of the version of the invention seen in FIGS. 1 and 2, having the narrow sides joined together by means of the fastening structures and having an annular formation having a distinct circumference.
Figure 9:
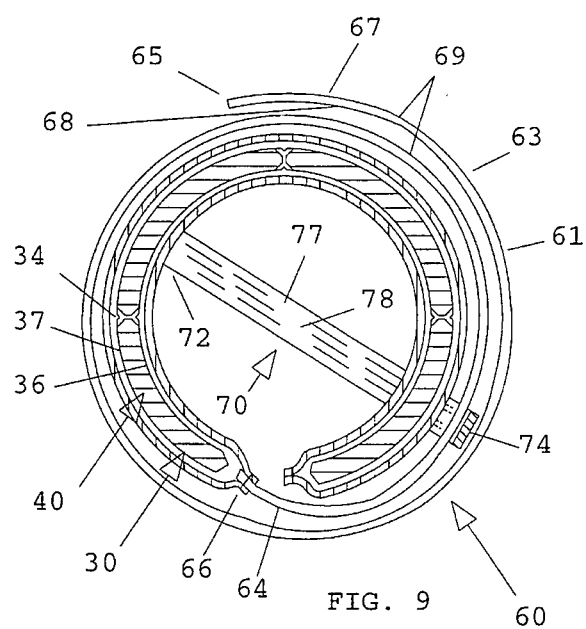
FIG. 9 shows a cross-sectional view of the version of the invention of FIG. 8, along the 9—9 lines, and does not show the insulation layer.

Referring in particular to FIGS. 1, 8 and 9, an adjustable, refreezable utility cooler 10 constructed in accordance with the principles of the invention is seen. A fabric cover 20 contains a refrigerant bag 30 containing a refrigerant 40 and an insulation layer 50. A lengthwise adjustable fastening structure 60 and a perpendicular adjustable fastening structure 70 are attached to the cover. The adjustable refreezable utility cooler 10 is prepared for use by storing the cooler 10 in a freezer, where the refrigerant 40 freezes into a solid. The fastening structures 60, 70 are then used to attach the cooler 10 to a object, such as a leftover food container, a package of prepared food, a soft drink can, or other object, which is then cooled or maintained at a cool temperature as a result of thermal conduction from the object into the refrigerant 40. The lengthwise fastening structures 70 may be used to join a plurality of coolers 10 in a chain-like manner, for use in cooling larger objects.

The cover 20 provides a fabric body 21 that is typically made out of a urethane coated nylon fabric. Alternatively, other fabrics or sheet materials may be used. However, the body 21 must be chosen to provide flexibility and strength in a wide range of temperatures, from below 0 degrees F. to over 100 degrees F. The body 21 is typically formed of an inside sheet 23 and an outside sheet 24 of similar fabric, held together by stitching 22. Generally, the long sides 26 of cover 20 are sewn on the inside (not shown), while the narrow sides 27 are sewn on the outside, as seen in FIGS. 1 and 2. The long sides 26 are sewn prior to the narrow sides 27, with the cover inside-out, and then the cover is turned right-side-out, as is well-known in the arts.

Two versions of the invention differ primarily in their dimensions. The smaller version, seen in FIGS. 1–4 and 7–9 provides only one lengthwise adjustable fastening structure 60, while the larger version, seen in FIGS. 5, 6, provides two such straps. In the smaller version, the length of the long side 26 should be about the length of the circumference of a 12 ounce soft drink can, or about 11 inches. This length is desirable because it promotes an easy fit on a soft drink can, and is also suitable for other uses. The narrow side 27 should be slightly less than the height of a 12 ounce soft drink can, or about 4 inches.

In the larger version of FIGS, 5 and 6, the narrow side 27 is approximately 8 inches and the long side 26 is approximately 15 inches. However, these dimensions are for the preferred embodiment, and could easily be altered to fit a particular need.

The refrigerant bag 30 provides a plastic sheet body that is typically made of 4 mil polyethylene. A first version of the refrigerant bag 30 is seen in FIG. 4, where the bag 30 is made from a plastic sheet body 31 such as a sleeve of plastic, initially having a circular cross section. An end seal 33 and a plurality of cross seals 34 are made by a heat sealing process that is well-known. The end and cross seals 33, 34 form pillow shaped refrigerant pouches 35, which are waterproof containers that contain refrigerant 40.

Figure 7:
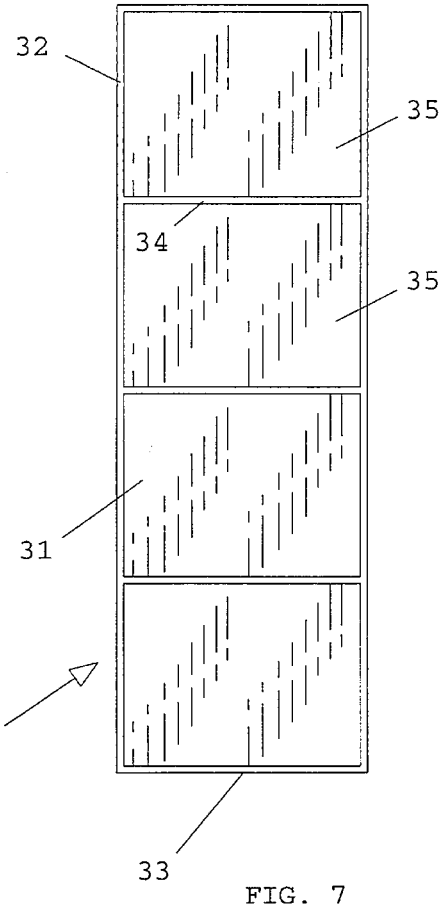
FIG. 7 shows a side view of a second version of refrigerant bag of the invention having end seals, cross seals and edge seals.

A second version of the refrigerant bag 30 of the invention is seen in FIG. 7. Edge seals 32 fuse together a plastic sheet body 31 formed from a rectangular inner sheet 36 and outer sheet 37 by a heat sealing process. End seal 33 and cross seals 34 form the refrigerant pouches 35, as in the first version, above.

The refrigerant 40 typically used is a substance known as "Blue Ice" or a similar material. The refrigerant 40 has similar thermal qualities to water, in that a large quantity of heat is absorbed as the substance changes state from solid to liquid. Also, the refrigerant is reusable, and may easily be refrozen by using the freezer of a typical kitchen refrigerator. The refrigerant typically consists of water in a gelatinous state produced by the addition of a viscosity increasing agent such as cornstarch or a methyl cellulose composition. Such additives tend to make the refrigerant softer than plain water when frozen.

The insulation layer 50 provides a thin layer of insulation, such as a material sold under the trade name Thinsulate, or a similar material. The insulation layer 50 functions to slow the flow of heat through the outside sheet 24 of the cover 20 and into the refrigerant 40. By slowing this heat flow, the refrigerant lasts longer, and is able to extract more heat energy from the object being cooled. The insulation layer 50 is seen in FIG. 3, but is not shown in FIG. 9. This is in part due to the fact that the insulation layer is present in the preferred embodiment, but is not absolutely required. Also, leaving the insulation layer out of FIG. 9 simplified and clarified that figure, which was primarily intended to illustrate other aspects of the invention.

The lengthwise adjustable fastening structure 60 provides an elongate strap 61 having a strip like body 67 and having a free end 65 and an end 64 that is attached to the narrow side 27 of the cover 20. The attached end 64 is typically sewn onto the narrow side 27 by means of stitching 66. The strap 61 provides an inside surface 68 and an outside surface 69. In the preferred embodiment, the inside surface 68 is usually covered, at least in part, by some type of male fastener material, such as male or hook velcro 62. The outside surface 69 is usually covered, at least in part, by some type of female fastener material, such as female or loop velcro 63. Other similar fastening materials may be substituted for velcro, or the sexes of the velcro reversed, if desired.

When either the first version of the invention, seen in either FIGS. 1 and 2 or second version of the invention, seen in FIGS. 5 and 6 is used, the lengthwise adjustable fastening structure 60 must be adjusted so that circumference of the cooler 10 corresponds to the circumference of the object to be cooled. The circumference is adjusted by altering the point of contact between the male fastener material 62 on the inside surface 68 of the strap 61 with the female fastener material 63 on the outside surface 69 of the strap 61 in a manner that is easily understood by reference to FIG. 9.

As seen in FIG. 12, a second version of the adjustable, refreezable utility cooler constructed in accordance with the principles of the invention is seen. In this version, female fastener material 63 is present on the inside surface 68 of the strap 61. A patch of male fastener material 62a is present on the outside sheet 24 of the cover 20 of the cooler 10.

When the circumference of a single cooler 10 is insufficient to accommodate the object to be cooled, two or more coolers may be joined by means of their lengthwise adjustable fastening structures 60. As seen in FIG. 10, the male fastener material 62 of a lengthwise adjustable fastening structure 60 of a first cooler 10a is attached to the female fastener material 63 of the fastener 60 of a second cooler 10b. As seen in FIG. 11, the two coolers 10a, 10b may be arrayed in a circular pattern by attaching the fastener 60 of the second cooler to the fastener 60 of the first cooler. Such a pattern would be useful where the circumference of the object to be cooled was greater than the length of one cooler 10.

The perpendicular adjustable fastening structure 70 provides a strip-like body 77 having an inside surface 78 and an outside surface 79. The outside surface 79 is covered by some type of female fastener material 74, such as female or loop velcro. The inside surface 78 has no velcro or other type of fastener attached. The strip-like body 77 is attached at end 72 to the long side 26 of the cover 20 by means of stitching. A free end 73 of body 77, as seen in FIGS. 1, 2, 5, 6 and 8, is unattached.

Once the circumference of the cooler 10 has been fixed, the perpendicular adjustable fastening structure 70 allows the user to fix the maximum distance between two points on the cooler 10. In this manner, the cooler 10 may be constrained into a shape appropriate for a cylindrical soft drink can or a rectangular T.V. dinner. As seen in FIG. 9, the inside surface 78 of the strip-like body 77 of the perpendicular adjustable fastening structure 70 functions effectively to support the bottom of a 12 ounce soft drink can (not shown), or to partially surround an object to be cooled.

The adjustable refreezable utility cooler of the invention is easily used. An object to be refrigerated is selected. If the object is smaller, then the first version of the invention, seen in FIGS. 1 and 2, is selected. If the object is larger, then the second version of the invention, seen in FIGS. 5 and 6, is selected. The cover 20 of the adjustable refreezable utility cooler 10 is then wrapped about the object to be cooled. If the object is generally cylindrical, then the cooler 10 appears generally as shown in FIG. 8. The lengthwise adjustable fastening structure 60 is then coiled about the cover 20, as seen in FIG. 8, until the male velcro 62 of the inside surface 68 contacts the female velcro 63 of the outside surface 69 of the strap 61. The perpendicular adjustable fastening structure 70 is then wrapped about the open end, as seen in FIG. 9, and the inside surface 78 then put in contact with the female velcro 63 of the strap 61. The free end 65 of the strap 61 is then wrapped in a manner that results in the male velcro 62 of the inside surface 68 contacting the female velcro 63, 74 of the outside surfaces 69, 79 of the fastening structures 60, 70, as seen in FIG. 8. Because the female velcro 74 of the perpendicular adjustable fastening structure is attached to the male velcro 62 of the strap 61, the fastening structures 60, 70 are held in a fixed relationship.

Where the larger version of the invention, seen in FIGS. 5 and 6 is used, the perpendicularly adjustable fastening structure 70 is typically attached to both lengthwise adjustable fastening structures 60.

To use more than one cooler 10 to cool an object, the coolers may be positioned as seen in FIG. 10. The two coolers may then be wrapped about the object to be cooled in much the same manner a single cooler. The lengthwise adjustable fastening structure 60 from cooler 10b should then be attached to the female fastener material 63 of cooler 10a. Alternatively, more than one cooler may be wrapped individually about a single object to be cooled, without the coolers being attached in lengthwise series.

The adjustable refreezable utility cooler of the invention has several advantages, including a lengthwise adjustable fastening structure that allows the circumference of the cooler to be adjusted according to the circumference of the object to be wrapped. As seen in FIG. 8, the circumference of the cooler may be altered by adjusting the space between the narrow sides 27 of the cover. The male velcro 62 and female velcro 63 of the strap 61 may be positioned in such a manner that the narrow sides 27 of the cover meet precisely, or in a manner that results in a space between the two sides 27, or in a manner that results in an overlap of the cover 20. Another advantage of the present invention is to provide a perpendicular adjustable fastening structure which allows the cooler to be adjusted to fit snugly about an object having known circumference and depth. The cooler that may be easily and conveniently refrozen for reuse, and is substantially flexible even after freezing, due to the distribution of refrigerant in several refrigerant pouches. More than one cooler may be used to cool larger objects. The coolers may be joined in the elongate manner shown in FIGS. 10 and 11, or more than one cooler may be used on a larger object in any manner desired by the user. For example, two coolers could be used on a 2 liter pop bottle, by wrapping one above the other.

Although the present invention has been described in considerable detail and with reference to certain preferred versions, other versions are possible. For example, while velcro fasteners were used, other fasteners could be substituted. Moreover, while the use of female or loop velcro on the outside surfaces 69, 79 of the fastening structures 60, 70 is preferred, male or hook velcro could be substituted, and female velcro used where male velcro was used. Therefore, the spirit and scope of the appended claims should not be limited to the description of the preferred versions contained here.

What is claimed is:

1. An adjustable refreezable utility cooler, comprising:
   (a) a cover comprising an inside sheet attached to an outside sheet, the inside sheet and outside sheet having a long side and a narrow side;
   (b) a refrigerant bag, carried in the cover, comprising a plurality of refrigerant pouches;
   (c) refrigerant means, carried by the refrigerant pouches, for absorbing heat energy;
   (d) insulation means, carried in the cover, for reducing the rate of heat energy flow between the refrigerant and the outside sheet of the cover;
   (e) lengthwise adjustable fastening means, attached to the narrow side of the cover, for adjusting the circumference of the cooler; and
   (f) a perpendicular adjustable fastening structure, attached to the long side of the cover and releasably attachable to the lengthwise adjustable fastening means.

2. The adjustable refreezable utility cooler of claim 1, wherein the lengthwise adjustable fastening means comprises:
   (a) means for linking two adjustable refreezable utility coolers together, thereby allowing the two linked coolers to be attached to an object to be cooled.

3. The adjustable refreezable utility cooler of claim 1, wherein the lengthwise adjustable fastening means comprises:
   (a) a strip-like body, attached to the narrow side of the cover, having an inside surface and an outside surface and having a length greater than the length of the long side of the cover,
   (b) a first sex of fastener material carried by the inside surface of the strip-like body; and
   (c) patch means comprising a covering of a second sex of fastener material, carried by the cover, for releasably holding the first sex of fastener material carried by the strip-like body in a fixed relationship.

4. The adjustable refreezable utility cooler of claim 1, wherein the lengthwise adjustable fastening means comprises:
   (a) a strip-like body, attached to the narrow side of the cover, having an inside surface and an outside surface and having a length greater than the length of the long side of the cover;
   (b) a first sex of fastener material carried by the inside surface of the strip-like body; and
   (c) a second sex of fastener material carried by the outside surface of the strip-like body.

5. The adjustable refreezable utility cooler of claim 4, wherein the perpendicular adjustable fastening structure comprises:
   (a) a strip-like body, attached to the long side of the cover, having an inside surface and an outside surface and having a length greater than the length of the narrow side of the cover;
   (b) the second sex fastener material carried by the inside surface of the strip-like body.

6. The adjustable refreezable utility cooler of claim 5, wherein the refrigerant bag additionally comprises:
   (a) a plastic sheet body, comprising an inner sheet and an outer sheet;
   (b) a plurality of cross seals and end seals, whereby the inner sheet is attached to the outer sheet in a water-tight seal; and
   (c) a plurality of refrigerant pouches.

7. The adjustable refreezable utility cooler of claim 6, wherein the refrigerant means changes from a solid state to a liquid state as heat is absorbed.

8. The adjustable refreezable utility cooler of claim 7, wherein the insulation means comprises a thin layer of insulation dimensioned incrementally smaller than the inside sheet of the cover.

9. An adjustable refreezable utility cooler, comprising:
   (a) a cover comprising an inside sheet attached to an outside sheet, the inside sheet and outside sheet having a long side and a narrow side;
   (b) refrigerant bag comprising:
      (a) a plurality of refrigerant pouches;
      (b) a plastic sheet body, comprising an inner sheet and an outer sheet;
      (c) a plurality of cross seals and end seals, whereby the inner sheet is attached to the outer sheet in a water-tight seal; and
      (d) a plurality of refrigerant pouches;
   (c) refrigerant means, carried by the refrigerant pouches, for absorbing heat energy, wherein the refrigerant means changes from a solid state to a liquid state as heat is absorbed;
   (d) insulation means for reducing the rate of heat energy flow between the refrigerant bag and the outside sheet of the cover, wherein the insulation means comprises a thin layer of insulation dimensioned incrementally smaller than the inside sheet of the cover;
   (e) lengthwise adjustable fastening means, attached to the narrow side of the cover, for adjusting the circumference of the cooler and for linking two adjustable refreezable utility coolers together, comprising:
      (a) a strip-like body, having an inside surface and an outside surface and having a length greater than the length of the long side of the cover, attached to the narrow side of the cover;

(b) a first sex of fastener material covering the inside surface of the strip-like body; and (c) a second sex of fastener material covering the outside surface of the strip-like body; and (f) perpendicular adjustable fastening structure means, attached to the long side of the cover and releasably attachable to the lengthwise adjustable fastening means, for supporting a portion of an object to be cooled, comprising:

(a) a strip-like body, having an inside surface and an outside surface and having a length greater than the length of the narrow side of the cover; and (b) the second sex of fastener material covering the inside surface of the strip-like body.

10. An adjustable refreezable utility cooler, comprising:

(a) a cover comprising an inside sheet attached to an outside sheet, the inside sheet and outside sheet having a long side and a narrow side;

(b) refrigerant bag comprising:
 (a) a plurality of refrigerant pouches;
 (b) a plastic sheet body, comprising an inner sheet and an outer sheet;
 (c) a plurality of cross seals and end seals, whereby the inner sheet is attached to the outer sheet in a watertight seal; and
 (d) a plurality of refrigerant pouches;

(c) refrigerant means, carried by the refrigerant pouches, for absorbing heat energy, wherein the refrigerant means changes from a solid state to a liquid state as heat is absorbed;

(d) insulation means for reducing the rate of heat energy flow between the refrigerant bag and the outside sheet of the cover, wherein the insulation means comprises a thin layer of insulation dimensioned incrementally smaller than the inside sheet of the cover;

(e) lengthwise adjustable fastening means, attached to the narrow side of the cover, for adjusting the circumference of the cooler and for linking two adjustable refreezable utility coolers together, comprising:

(a) a strip-like body, having an inside surface and an outside surface and having a length greater than the length of the long side of the cover, attached to the narrow side of the cover;

(b) a first sex of fastener material covering the inside surface of the strip-like body; and (c) patch means having a covering of a second sex of fastener material, carried by the cover, for releasably attaching to the first sex of fastener material carried by the strip-like body in a fixed relationship; and (f) perpendicular adjustable fastening structure means, attached to the long side of the cover and releasably attachable to the lengthwise adjustable fastening means, for supporting a portion of an object to be cooled, comprising:

(a) a strip-like body, having an inside surface and an outside surface and having a length greater than the length of the narrow side of the cover, and (b) the second sex of fastener material covering the inside surface of the strip-like body.

* * * * *